United States Patent
He et al.

(10) Patent No.: US 12,261,692 B2
(45) Date of Patent: *Mar. 25, 2025

(54) DATA PROCESSING SYSTEM AND METHOD BASED ON DYNAMIC REDUNDANCY HETEROGENEOUS ENCODING, AND DEVICE

(71) Applicants: CHINA NATIONAL DIGITAL SWITCHING SYSTEM ENGINEERING & TECHNOLOGICAL R&D CENTER, Henan (CN); ZHUHAI COMLEADER INFORMATION SCIENCE & TECHNOLOGY CORP., LTD., Guangdong (CN)

(72) Inventors: Lei He, Henan (CN); Jiangxing Wu, Henan (CN); Quan Ren, Henan (CN); Peng Yi, Henan (CN); Xiang Chen, Henan (CN); Jing Yu, Henan (CN); Kun Zhou, Henan (CN); Yiwei Guo, Guangdong (CN); Zhifeng Feng, Guangdong (CN)

(73) Assignees: CHINA NATIONAL DIGITAL SWITCHING SYSTEM ENGINEERING & TECHNOLOGICAL R&D CENTER, Henan (CN); ZHUHAI COMLEADER INFORMATION SCIENCE & TECHNOLOGY CORP., LTD., Guangdong (CN)

(*) Notice: Subject to any disclaimer, the term of this patent is extended or adjusted under 35 U.S.C. 154(b) by 0 days.

This patent is subject to a terminal disclaimer.

(21) Appl. No.: 18/262,270

(22) PCT Filed: Jun. 7, 2021

(86) PCT No.: PCT/CN2021/098598
§ 371 (c)(1),
(2) Date: Jul. 20, 2023

(87) PCT Pub. No.: WO2022/170709
PCT Pub. Date: Aug. 18, 2022

(65) Prior Publication Data
US 2024/0121027 A1    Apr. 11, 2024

(30) Foreign Application Priority Data
Feb. 9, 2021  (CN) .......................... 202110176513.8

(51) Int. Cl.
*H04L 1/00*    (2006.01)
*G06F 11/00*   (2006.01)

(52) U.S. Cl.
CPC .......... *H04L 1/0045* (2013.01); *H04L 1/0041* (2013.01); *G06F 11/00* (2013.01)

(58) Field of Classification Search
CPC ................ H04L 1/0041; H04L 1/0045; H04L 2209/34; G06F 11/00
See application file for complete search history.

(56) References Cited

U.S. PATENT DOCUMENTS 10,070,327 B2   9/2018  Yang
10,296,913 B1   5/2019  Breitman
(Continued)

FOREIGN PATENT DOCUMENTS

CN    101090306 A   12/2007
CN    103369703 A   10/2013
(Continued)

OTHER PUBLICATIONS

International Search Report and Written Opinion for PCT/CN2021/098598 dated Oct. 29, 2021; 12 pages including English translation.
(Continued)

*Primary Examiner* — Justin R Knapp
(74) *Attorney, Agent, or Firm* — Schwabe, Williamson & Wyatt, P.C.

(57) ABSTRACT

Provided are a data processing system and method based on dynamic redundancy heterogeneous encoding, and a device. The method comprises: respectively performing error correction encoding on information to be processed and a processing rule, so as to form encoded information to be processed and an encoded processing rule; processing, by
(Continued)

using the encoded processing rule, the encoded information to be processed, so as to obtain response data; and then performing error correction decoding on N pieces of response data, so as to obtain processing result information of the information to be processed.

12 Claims, 3 Drawing Sheets

(56) References Cited

U.S. PATENT DOCUMENTS

| | | | |
|---|---|---|---|
| 10,700,813 B2* | 6/2020 | Nammi | .................. H04L 69/22 |
| 2006/0156185 A1 | 7/2006 | Zhang | |
| 2009/0049073 A1 | 2/2009 | Cho | |
| 2010/0122105 A1 | 5/2010 | Arslan | |
| 2011/0302583 A1 | 12/2011 | Abadi | |
| 2011/0320864 A1 | 12/2011 | Gower | |
| 2012/0089884 A1 | 4/2012 | Kamiya | |
| 2013/0294225 A1 | 11/2013 | Zhang | |
| 2018/0270015 A1 | 9/2018 | Yokokawa | |
| 2020/0336244 A1 | 10/2020 | Shokrollahi | |
| 2023/0033253 A1 | 2/2023 | He | |
| 2023/0039521 A1 | 2/2023 | He | |
| 2024/0113809 A1* | 4/2024 | He | ........................ H04L 1/0009 |
| 2024/0121029 A1* | 4/2024 | He | ........................ H04L 1/0041 |

FOREIGN PATENT DOCUMENTS

| | | |
|---|---|---|
| CN | 106850188 A | 6/2017 |
| CN | 110162983 A | 8/2019 |
| CN | 111339071 A | 6/2020 |
| CN | 111769903 A | 10/2020 |
| CN | 112217604 A | 1/2021 |
| CN | 112217778 A | 1/2021 |
| WO | 2010/073922 A1 | 7/2010 |

OTHER PUBLICATIONS

Ji-Yan et al., "A Novel Joint Source-Channel Coding Scheme for Mobile Video Delivery in Heterogeneous Wireless Networks" Chinese Journal of Computers, vol. 37, No. 22 (2014); 16 pages.

Koca, et al. "Turbo Decoding of Multiple Description Source and Channel Codes" IEEE (2004); pp. 176-179.

Jianping, "Research on the physical layer security in multihop wireless networks: A Dissertation submitted for the degree of Doctor of Philosophy" South China University of Technology, Guangzhou, CN, 111 pages including English Abstract. (uploaded in 16 parts).

Bin, "A Transformation Principle of Regenerated Code for Heterogeneous Distributed Storage" Modern Electronics Technique, vol. 42, No. 24, Dec. 2019; 4 pages.

Hailong, "Dynamic Heterogeneous Redundancy Based Router Architecture with Mimic Defenses" Journal of Cyber Security, vol. 2, No. 1, Jan. 31, 2017, chapters 2-3 (14 pages).

Wang, "Modelization and Analysis of Dynamic Heterogeneous Redundant System" Concurrency and Computation: Practice and Experience, Oct. 13, 2020, 16 pages.

Ying, "Improvement on Transmission Mechanism of Dynamic Forward Error Correction Code" Journal of Southern Yangtze (Natural Science Edition), vol. 5, No. 2, Apr. 2006; 5 pages.

* cited by examiner

DATA PROCESSING SYSTEM AND METHOD BASED ON DYNAMIC REDUNDANCY HETEROGENEOUS ENCODING, AND DEVICE

The present application is the national phase of International Patent Application No. PCT/CN2021/098598, titled "DATA PROCESSING SYSTEM AND METHOD BASED ON DYNAMIC REDUNDANCY HETEROGENEOUS ENCODING, AND DEVICE", filed on Jun. 7, 2021, which claims priority to Chinese Patent Application No. 202110176513.8, titled "DATA PROCESSING SYSTEM AND METHOD BASED ON DYNAMIC REDUNDANCY HETEROGENEOUS ENCODING, AND DEVICE", filed on Feb. 9, 2021 with the China National Intellectual Property Administration, both of which are incorporated herein by reference in their entireties.

FIELD

The present disclosure relates to the field of electronic information, and in particular, to a data processing system, method and device based on dynamically redundant heterogeneous encoding.

BACKGROUND

Information and communication network technology is developing rapidly. Currently, encryption is used as a protection scheme mostly to ensure the integrity and privacy of information during transmission and processing. Due to the inevitable occurrence of security problems in an information system, the way of encrypting data with a single key cannot guarantee that information will not be tampered with and stolen during transmission and processing. In other words, the existing communication system cannot correct generalized disturbances.

SUMMARY

The present disclosure provides a data processing system, method and device based on dynamically redundant heterogeneous encoding, with the purpose of solving the problem of how to correct generalized disturbances.

To achieve the above objective, following technical solutions are provided by the present disclosure.

A data processing system based on dynamically redundant heterogeneous encoding includes: a structural encoder, encoded channels, a feedback controller, and an error correction decoder;

where the encoded channel includes M redundant meta-channels, each of the meta-channels is pre-configured with an encoded processing rule generated by performing an error correction encoding on a processing rule; the encoded processing rules and the processing rules are used for implementing functions of the M meta-channels; the processing rules and encoded processing rules configured for the M meta-channels implement a same function, and the encoded processing rules configured for the M meta-channels are heterogeneous; where M is an integer greater than or equal to 2;

the feedback controller is configured to: select N meta-channels from the M meta-channels as online meta-channels, and send out error correction encoding information; where N is an integer greater than or equal to 2, and M is greater than or equal to N;

the structural encoder is configured to: perform N-channel error correction encoding on to-be-processed information according to the error correction encoding information, so as to obtain N pieces of heterogeneous encoded to-be-processed information, and send the N pieces of heterogeneous encoded to-be-processed information to matched online meta-channels respectively;

each of the online meta-channels is configured to: process, according to the encoded processing rule, the encoded to-be-processed information received by the online meta-channel so as to obtain response data; and the error correction decoder is configured to: perform error correction decoding on N channels of response data respectively, so as to obtain response information corresponding to the to-be-processed information.

Optionally, the feedback controller is further configured to: construct the M meta-channels before selecting N meta-channels from the M meta-channels, where the constructing the M meta-channels includes: perform error correction encoding on meta-channel programs and/or meta-channel data configured for the M meta-channels, to obtain the M meta-channels with heterogeneous encoded processing rules.

Optionally, the feedback controller the configured to select N meta-channels from the M meta-channels as online meta-channels and send out error correction encoding information by:

taking error information in performing the error correction decoding as basis for selecting the N meta-channels from the M meta-channels and as basis for sending out the error correction encoding information.

Optionally, the feedback controller is further configured to:

update at least one of the online meta-channels and the error correction encoding information according to the error information in performing the error correction decoding.

Optionally, the data processing system further includes an erasing module configured to erase memory of the meta-channels that go offline.

Optionally, the processing rule includes: meta-channel data and a meta-channel program;

the encoded processing rule includes at least one of encoded meta-channel data generated by performing error correction encoding on the meta-channel data, and an encoded meta-channel program generated by performing error correction encoding on the meta-channel program;

the to-be-processed information includes an instruction and to-be-processed data; and the encoded to-be-processed information includes at least one of an encoded instruction generated by performing error correction encoding on the instruction, and encoded to-be-processed data generated by performing error correction encoding on the to-be-processed data.

Optionally, the encoded processing rule and the processing rule have the same semantics; the encoded to-be-processed information and the to-be-processed information have the same semantics.

Optionally, heterogeneity of encoded processing rules configured for the M meta-channels includes at least one of:

heterogeneity in contents of the encoded meta-channel data, heterogeneity in structures of the encoded meta-channel data, heterogeneity in instruction contents of the encoded meta-channel programs and heterogeneity in instruction sequences of the encoded meta-channel programs in the M meta-channels;

the heterogeneity in the contents of the encoded meta-channel data includes at least one of: signature diversity, tag diversity, verification diversity, encryption diversity, scrambling diversity, compression diversity, transformation diversity, and compilation diversity;

the heterogeneity in structures of the encoded meta-channel data includes at least one of inter-frame and intra-frame stack layout randomization, stack randomization, basic block diversity, compilation diversity, and conversion diversity of converting a stack variable to a stack;

the heterogeneity in instruction contents of the encoded meta-channel programs includes at least one of: signature diversity, tag diversity, verification diversity, encryption diversity, scrambling diversity, compression diversity, transformation diversity, compilation diversity, instruction random tag diversity, and instruction set randomization; and the heterogeneity in instruction sequences of the encoded meta-channel programs includes at least one of: randomization of a position of an instruction for realizing dynamically heterogeneous redundancy of a meta-channel operation sequence, basic block diversity, randomization of a position of a block-level instruction, probabilistic control flow integrity, diversity of structured non-overlapping codes and calling sequences, diversity of adapted processors, diversity of adapted operating systems, diversity of adapted software protocols, diversity of adapted databases, compilation diversity, and diversity of programming languages.

Optionally, the N pieces of heterogeneous encoded to-be-processed information includes N pieces of encoded to-be-processed information have at least one of heterogeneity in data contents, heterogeneity in data structures, heterogeneity in instruction contents, and heterogeneity in instruction sequences;

the heterogeneity in data contents includes at least one of: signature diversity, tag diversity, verification diversity, encryption diversity, scrambling diversity, compression diversity, transformation diversity, and compilation diversity;

the heterogeneity in data structures includes at least one of inter-frame and intra-frame stack layout randomization, stack randomization, basic block diversity, compilation diversity, and conversion diversity of converting a stack variable to a stack;

the heterogeneity in instruction contents includes at least one of: signature diversity, tag diversity, verification diversity, encryption diversity, scrambling diversity, compression diversity, transformation diversity, compilation diversity, instruction random tag diversity, and instruction set randomization; and the heterogeneity in instruction sequences the heterogeneity in instruction sequences includes at least one of randomization of: a position of an instruction for realizing dynamically heterogeneous redundancy of a meta-channel operation sequence, basic block diversity, randomization of a position of a block-level instruction, probabilistic control flow integrity, diversity of structured non-overlapping codes and calling sequences, diversity of adapted processors, diversity of adapted operating systems, diversity of adapted software protocols, diversity of adapted databases, compilation diversity, and diversity of programming languages.

Optionally, the error correction decoder is further configured to perform error correction decoding on N channels of response data so as to obtain response information corresponding to the to-be-processed information by:

decoding the N channels of response data with a scheme corresponding to a scheme of the error correction encoding, to obtain N channels of data to be determined; and performing an error correction determination process on the N channels of data to be determined, to obtain a processing result.

A data processing method based on dynamically redundant heterogeneous encoding includes:

performing N-channel error correction encoding on to-be-processed information to obtain N pieces of heterogeneous encoded to-be-processed information;

performing N-channel redundancy processing on the N pieces of heterogeneous encoded to-be-processed information to obtain N channels of response data, where a processing flow in any channel of the N-channel redundancy processing includes: processing the encoded to-be-processed information according to an encoded processing rule that is pre-configured, the encoded processing rule being generated by performing error correction encoding on a pre-configured processing rule, and encoded processing rules to be used in the N-channel redundancy processing being heterogeneous; and performing error correction decoding on the N channels of response data to obtain response information corresponding to the to-be-processed information.

An electronic device includes a memory and a processor; where the memory is stored with a program, and the processor is configured to run the program to implement the foregoing data processing method based on dynamically redundant heterogeneous encoding.

A computer-readable storage medium having a program stored thereon, where the program, when being executed by an electronic device, implements the foregoing data processing method based on dynamically redundant heterogeneous encoding.

According to the data processing system, method and device based on dynamically redundant heterogeneous encoding, error correction encoding is performed on to-be-processed information and processing rules to generate encoded to-be-processed information and encoded processing rules; response data is obtained by processing the encoded to-be-processed information with the encoded processing rules; and error correction decoding is performed on the N channels of response data, to obtain processing result corresponding to the to-be-processed information. The N pieces of encoded to-be-processed information re heterogeneous, and the encoded processing rules used in the N meta-channels are heterogeneous, thus the randomness of the processing is increased. Furthermore, the error correction encoding and decoding can correct generalized disturbances in the data processing, improving the security of data processing.

BRIEF DESCRIPTION OF THE DRAWINGS

In order to illustrate technical solutions in embodiments of the present disclosure or in the conventional technology more clearly, drawings used in the description of the embodiments or the conventional technology are introduced briefly hereinafter. Apparently, the drawings described in the following illustrate some embodiments of the present disclosure; other drawings may be obtained by those ordinarily skilled in the art based on these drawings without any creative efforts.

DETAILED DESCRIPTION

The technical solutions in the embodiments of the present disclosure will be described clearly and completely hereinafter in conjunction with the drawings in the embodiments of the present disclosure. Apparently, the described embodiments are only some of the embodiments of the present disclosure, rather than all embodiments. Any of other embodiments made by the person skilled in the art based on the embodiments in the present disclosure without any creative efforts, fall within the scope of the present disclosure.

Figure 1:
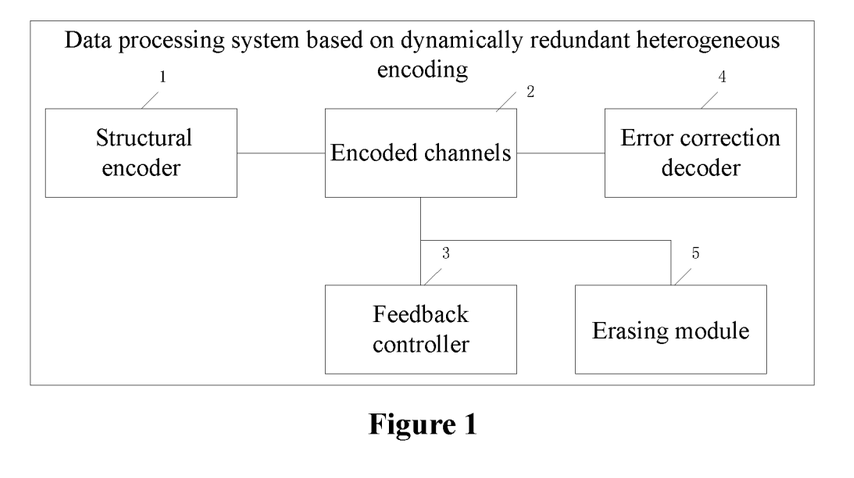
FIG. 1 is a schematic structural diagram of a data processing system based on dynamically redundant heterogeneous encoding according to an embodiment of the present disclosure.

FIG. 1 is a schematic structural diagram of a data processing system based on dynamically redundant heterogeneous encoding according to an embodiment of the present disclosure. The data processing system includes: a structural encoder 1, encoded channels 2, a feedback controller 3, and an error correction decoder 4. Optionally, the data processing system may further include an erasing module 5. Functions of the above-mentioned components will be described in detail hereinafter.

The encoded channels 2 include M redundant meta-channels. The redundant meta-channels refer to meta-channels that realize a same function (or purpose), for example, a function of cleaning to-be-processed information. M is an integer greater than or equal to 2.

Each meta-channel is pre-configured with an encoded processing rule, and the encoded processing rule is generated by performing an error correction encoding on a processing rule pre-configured for each meta-channel. The encoded processing rules and the processing rules are for implementing functions of the meta-channels, and the M meta-channels are redundant, thus the processing rules pre-configured for the M meta-channels realize a same function (or purpose).

In this embodiment, encoded processing rules in the M meta-channels are heterogeneous. Specific manners for implementing heterogeneity and the error correction encoding are described later.

The feedback controller 3 is configured to: select N meta-channels from the M meta-channels as online meta-channels, and send out error correction encoding information; where N is an integer greater than or equal to 2, and M is greater than or equal to N.

The structural encoder 1 is configured to perform an N-channel error correction encoding on to-be-processed information according to the error correction encoding information so as to obtain N pieces of heterogeneous encoded to-be-processed information, and send the N pieces of heterogeneous encoded to-be-processed information to matched online meta-channels respectively.

A matched online meta-channel refers to an online meta-channel which is preconfigured with an encoded processing rule capable of identifying the encoded to-be-processed information.

Each of the online meta-channels is configured to process, according to the encoded processing rule, the encoded to-be-processed information received by the online meta-channel so as to obtain response data.

The error correction decoder 4 is configured to perform an error correction decoding on N channels of response data so as to obtain response information corresponding to the to-be-processed information.

The erasing module 5 is configured to erase memory of the meta-channels that go offline, where an online meta-channel goes offline to become an offline meta-channel.

In the data processing system shown in FIG. 1, multiple redundant meta-channels have encoded processing rules that are heterogeneous from one another. And the heterogeneous encoded processing rules are used for processing the heterogeneous encoded to-be-processed information, to obtain response data. Thus the randomness of the processing is increased. An error correction decoding is performed on the response data to obtain result information. On the basis of higher randomness, combined with characteristics of error correction decoding, the system has the ability of correcting generalized disturbances and in turn has improved security. Furthermore, the memories of offline meta-channels are erased, therefore improving the ability of correcting the generalized disturbances and increasing the safety.

Figure 2:
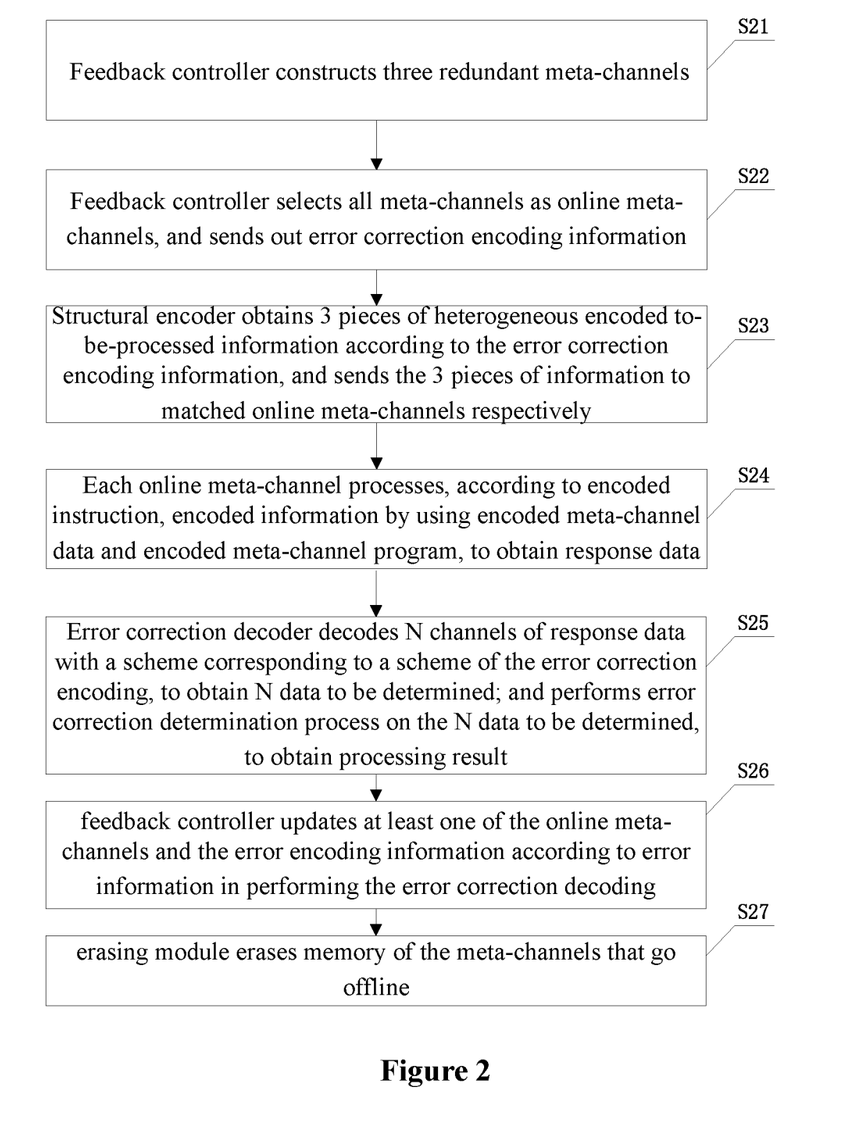
FIG. 2 is a flow chart of implementing data processing by a data processing system based on dynamically redundant heterogeneous encoding according to an embodiment of the present disclosure.

In the following, taking M=3 and N=3 as an example, functions of components in the system shown in FIG. 1 will be further described. FIG. 2 shows a flow of data processing through interaction among various components in the system shown in FIG. 1, which includes the following steps.

In step S21, feedback controller 3 constructs three redundant meta-channels.

In an embodiment, the feedback controller 3 performs error correction encoding on processing rules configured for the meta-channels to obtain encoded processing rules.

Generally, a processing rule configured for a meta-channel includes meta-channel data and a meta-channel program. The heterogeneity of the encoded processing rules may include at least one of heterogeneity in encoded meta-channel data and heterogeneity in encoded meta-channel programs.

Optionally, the heterogeneity in the encoded meta-channel data includes at least one of: heterogeneity in contents of the encoded meta-channel data and heterogeneity in structures of the encoded meta-channel data.

Optionally, the heterogeneity in the contents of the encoded meta-channel data includes at least one of: signature diversity, tag diversity, verification diversity, encryption diversity, scrambling diversity, compression diversity, transformation diversity, and compilation diversity.

Optionally, the heterogeneity in structures of the encoded meta-channel data includes at least one of: inter-frame and intra-frame stack layout randomization, stack randomization, basic block diversity, compilation diversity, and conversion diversity of converting a stack variable to a stack.

Optionally, the heterogeneity in the encoded meta-channel programs includes at least one of: heterogeneity in instruction contents of the encoded meta-channel programs and heterogeneity in instruction sequences of the encoded meta-channel programs.

Optionally, the heterogeneity in instruction contents of the encoded meta-channel programs includes at least one of signature diversity, tag diversity, verification diversity, encryption diversity, scrambling diversity, compression diversity, transformation diversity, compilation diversity, instruction random tag diversity, and instruction set randomization.

Optionally, the heterogeneity in instruction sequences of the encoded meta-channel programs includes at least one of: randomization of a position of an instruction for realizing dynamically heterogeneous redundancy of a meta-channel operation sequence, basic block diversity, randomization of a position of a block-level instruction, probabilistic control flow integrity, diversity of structured non-overlapping codes and calling sequences, diversity of adapted processors, diversity of adapted operating systems, diversity of adapted software protocols, diversity of adapted databases, compilation diversity, and diversity of programming languages.

The error correction encoding schemes to achieve the heterogeneity may be N existing heterogeneous error correction encoding schemes or N customized heterogeneous error correction encoding schemes.

In this embodiment, it is assumed that a function implemented in a meta-channel is "converting a website address into a domain name", and meta-channel data is a mapping relationship between the website address and the domain name, namely "www.abc.com--1.2.3.4". The two parts of the mapping relationship are subjected to the error-correction encoding separately to get the following encoded meta-channel data.

Encoded meta-channel data used in a first channel is: "www.123.com--A.B.C.D". Encoded meta-channel data used in a second channel is: "www.456.com--1.3.2.4". Encoded meta-channel data used in a third channel is: "www.789.com--1.1.1.1".

In this embodiment, an example is described in connection with encoded meta-channel programs with heterogeneity of maximum granularity.

An encoded meta-channel program in the first online meta-channel meets the following requirements: adapting to Intel processor, adapting to FreeBSD operating system, adapting to Unbound software protocol, using Python programming language, and adapting to Oracle database.

An encoded meta-channel program in the second online meta-channel meets the following requirements: adapting to ARM processor, adapting to CentOS operating system, adapting to NSD software protocol, using Java programming language, and adapting to ACCESS database.

An encoded meta-channel program in the third online meta-channel meets the following requirements: adapting to FPGA processor, adapting to UNIX operating system, adapting to BIND software protocol, using C++ programming language, and adapting to MySQL database.

In this embodiment, the scheme of error correction encoding is not limited, and reference may be made to the prior art for the specific implementation of the error correction encoding.

In addition to performing error correction encoding on the meta-channel data and the meta-channel program, reference for other steps of the feedback controller 3 to construct the meta-channel may be made to the prior art.

In step S22, the feedback controller 3 selects all meta-channels as online meta-channels, and sends out error correction encoding information.

In one embodiment, N meta-channels may be selected from the M meta-channels according to error information in performing the error correction decoding, and error correction encoding information may be sent out.

In one embodiment, the error information includes a code word different from others, and a degree of error. The error information may be determined in any manner known in the art.

It is understandable that an example of selecting the online meta-channels includes: increasing the value of N as the degree of error getting higher, to reduce the error degree. An example of sending out the error correction encoding information includes: increasing the heterogeneity between error correction encoding algorithms indicated by the error correction encoding information as the degree of error getting higher.

It is understandable that before the error correction decoder initially performing the error correction decoding (for example, at initialization of the system), an initial configuration may be taken as the basis for selecting the online meta-channels and for send out the error correction encoding information.

In step S23, structural encoder 1 performs a 3-channel error correction encoding on the to-be-processed information according to the error correction encoding information, to obtain three pieces of heterogeneous encoded to-be-processed information, and sends the three pieces of heterogeneous encoded to-be-processed information to matched online meta-channels respectively.

In an embodiment, the to-be-processed information includes an instruction and to-be-processed data. In this embodiment, it is assumed that the to-be-processed information is: "visit www.abc.com". In other words, the instruction is "visit" and the to-be-processed data is "www.abc.com".

The error correction encoding information indicates scheme(s) for performing error correction encoding on the instruction and/or the to-be-processed data in the to-be-processed information. In this embodiment, error correction encoding is performed on both the instruction and the to-be-processed data.

It is understandable that encoded to-be-processed information is subsequently processed in the online meta-channels, so the generated encoded to-be-processed information needs to be identifiable by the encoded processing rules in the meat-channels (being matched with the encoded processing rules of the meta-channels). Therefore, the error correction encoding information specifically indicates encoding algorithms and sending modes to be used for the to-be-processed information. The sending modes indicate that the encoded to-be-processed information is to be sent to which online meta-channels.

In the above example, the to-be-processed data in the to-be-processed information are encoded into "www.123.com", "www.456.com", and "www.789.com" according to the error correction encoding information.

The instruction is encoded in the following way:

An encoded instruction of the first channel meets the following requirements: adapting to Intel processor, adapting to FreeBSD operating system, adapting to Unbound software protocol, using Python programming language, and adapting to Oracle database.

An encoded instruction of the second channel meets the following requirements: adapting to ARM processor, adapting to CentOS operating system, adapting to NSD software protocol, using Java programming language, and adapting to ACCESS database.

An encoded instruction of the third channel meets the following requirements: adapting to FPGA processor, adapting to UNIX operating system, adapting to BIND software protocol, using C++ programming language, and adapting to MySQL database.

In addition, "www.123.com" and the encoded instruction of the first channel are sent to the first encoded meta-channel; "www.456.com" and the encoded instruction of the second channel are sent to the second encoded meta-channel; and "www.789.com" and the encoded instruction of the third channel are sent to the third encoded meta-channel, thus the encoded instructions, encoded to-be-processed data, encoded meta-channel data and encoded meta-channel programs are matched.

In step S24, each of the online meta-channels processes, according to the encoded instruction, the encoded to-be-processed information by using encoded meta-channel data and encoded meta-channel program, to obtain response data.

Optionally, in order to improve the security without reducing the accuracy of the result information, the principle of keeping semantics unchanged should be followed when performing the error correction encoding on the instruction in the to-be-processed information and the meta-channel programs. In other words, N-channel error correction encoding without changing semantics is performed on the instruction in the to-be-processed information, to obtain the N heterogeneous encoded instructions with semantics unchanged. Moreover, the encoded meta-channel program has the same semantics as the meta-channel program.

Unchanged semantics means that the instructions and meta-channel programs obtained by the error correction encoding do not affect the processing of the to-be-processed data. In an embodiment, the semantics are unchanged in two cases: the first case is that the data structure is unchanged, i.e., the type and length are unchanged; and the second case is that when the data structure is changed, the meta-channel program is changed accordingly to adapt to the change of the data structure. The semantics of the program or instruction being unchanged includes: the logic or function for data processing being unchanged.

In step S25, the error correction decoder 4 decodes the N channels of response data with a scheme corresponding to a scheme of the error correction encoding, to obtain N data to be determined; and performs an error correction determination on the N data to be determined, to obtain processing result.

In step S26, the feedback controller 3 updates at least one of the online meta-channels and the error encoding information according to error information in performing the error correction decoding.

In an embodiment, updating online meta-channels may include: replacing the online meta-channels with meta-channels that were previously offline, or reducing or increasing the number of the online meta-channels.

In step S27, erasing module 5 erases memory of the meta-channels that go offline.

A specific scenario is taken as an example to illustrate the method shown in FIG. 2. DHR error correction encoding is performed on the data processing (computation, communication) process, thus the generalized disturbance errors in the processing results of dynamically heterogeneous redundant meta-channels are random. And the error correction decoding is performed based on relative correctness axioms (nearest neighbor decoding/maximum likelihood decoding), resulting in higher security of the data processing.

Figure 3:
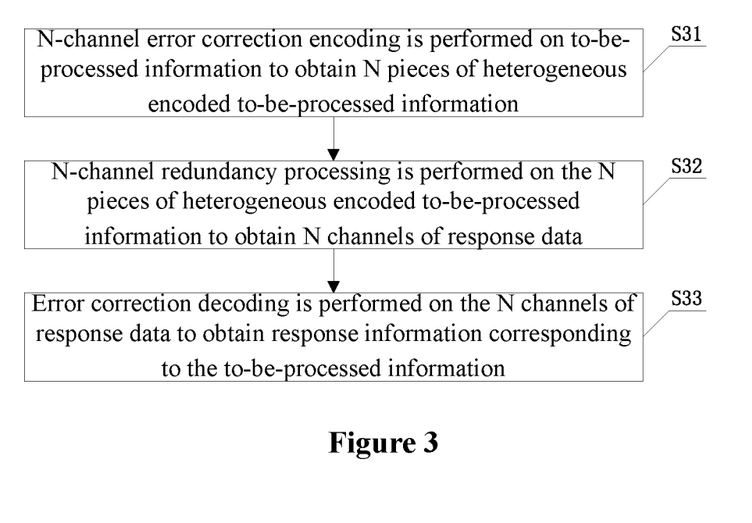
FIG. 3 is a flow chart of a data processing method based on dynamically redundant heterogeneous encoding according to an embodiment of the present disclosure.

FIG. 3 is a flow chart of a data processing method based on dynamically redundant heterogeneous encoding according to an embodiment of the present disclosure. The data processing method includes following steps.

In step S31, N-channel error correction encoding is performed on to-be-processed information to obtain N pieces of heterogeneous encoded to-be-processed information.

In step S32, N-channel redundancy processing is performed on the N pieces of heterogeneous encoded to-be-processed information to obtain N channels of response data.

A processing flow in any channel of the N-channel redundancy processing includes: processing the encoded to-be-processed information according to an encoded processing rule that is pre-configured, the encoded processing rule being generated by performing error correction encoding on a pre-configured processing rule, and encoded processing rules to be used in the N-channel redundancy processing being heterogeneous.

In step S33, error correction decoding is performed on the N channels of response data to obtain response information corresponding to the to-be-processed information.

Specific implementation of the above steps may refer to the foregoing embodiments, which will not be described again herein.

An electronic device is also provided according to an embodiment of the present disclosure, including a memory and a processor; where the memory is stored with a program, and the processor is configured to run the program to implement the foregoing data processing method based on dynamically redundant heterogeneous encoding.

A computer-readable storage medium having a program stored thereon is also provided according to an embodiment of the present disclosure. The program, when being executed by an electronic device, implements the foregoing data processing method based on dynamically redundant heterogeneous encoding.

The functions described in the method of the embodiments of the present disclosure, when implemented in the form of software functional units and sold or used as independent products, the software functional units may be stored in a storage medium readable by a computing device. Based on such understanding, the technical solutions of the disclosure, part of the disclosure that contributes to existing technologies or part of the technical solutions may be embodied in the form of a computer software product. The software product is stored in a storage medium and includes several instructions for instructing a computing device (which may be personal computer, server, mobile computing device, network device or the like) to implement all of or part of the steps of the methods according to the embodiments of the disclosure. The foregoing storage medium includes various media that can store program codes, for example, USB disk, mobile hard disk drive, Read-Only Memory (ROM), Random Access Memory (RAM), magnetic disk, optical disk and the like.

The embodiments in the present disclosure are described in a progressive manner. Each of the embodiments is mainly focused on describing its differences from other embodiments, and references may be made among these embodiments with respect to the same or similar portions among these embodiments.

Based on the above description of the disclosed embodiments, those skilled in the art are capable of carrying out or using the present disclosure. It is obvious for those skilled in the art to make many modifications to these embodiments. The general principle defined herein may be applied to other embodiments without departing from the spirit or scope of the present disclosure. Therefore, the present disclosure is not limited to the embodiments illustrated herein, but should be defined by the broadest scope consistent with the principle and novel features disclosed herein.

The invention claimed is:

1. A data processing system based on dynamically redundant heterogeneous encoding, comprising: a structural encoder, encoded channels, a feedback controller, and an error correction decoder; wherein:

the encoded channels comprise M redundant meta-channels, each of the meta-channels is pre-configured with an encoded processing rule generated by performing an error correction encoding on a processing rule; the encoded processing rules and the processing rules are configured for implementing functions of the meta-channels; the processing rules and the encoded processing rules configured for the M meta-channels implement a same function, and the encoded processing rules configured for the M meta-channels are heterogeneous; and M is an integer greater than or equal to 2;

the feedback controller is configured to: select N meta-channels from the M meta-channels as online meta-channels, and send out error correction encoding information; wherein N is an integer greater than or equal to 2, and M is greater than or equal to N;

the structural encoder is configured to: perform N-channel error correction encoding on to-be-processed information according to the error correction encoding information, so as to obtain N pieces of heterogeneous encoded to-be-processed information, and send the N pieces of heterogeneous encoded to-be-processed information to matched online meta-channels respectively;

each of the online meta-channels is configured to: process, according to the encoded processing rule, the encoded to-be-processed information received by the online meta-channel so as to obtain response data; and the error correction decoder is configured to: perform error correction decoding on N channels of response data respectively, so as to obtain response information corresponding to the to-be-processed information.

2. The data processing system according to claim 1, wherein the feedback controller is further configured to: construct the M meta-channels before selecting N meta-channels from the M meta-channels, wherein the constructing the M meta-channels comprises: performing error correction encoding on meta-channel programs and/or meta-channel data configured for the M meta-channels, to obtain the M meta-channels with heterogeneous encoded processing rules.

3. The data processing system according to claim 1, wherein the feedback controller is further configured to select N meta-channels from the M meta-channels as online meta-channels and send out error correction encoding information by:

taking error information in performing the error correction decoding as basis for selecting the N meta-channels from the M meta-channels and as basis for sending out the error correction encoding information.

4. The data processing system according to claim 1, wherein the feedback controller is further configured to:

update at least one of the online meta-channels and the error correction encoding information according to error information in performing the error correction decoding.

5. The data processing system according to claim 1, further comprising an erasing module configured to erase memory of the meta-channels that go offline.

6. The data processing system according to claim 1, wherein each of the processing rules comprises meta-channel data and a meta-channel program;

each of the encoded processing rules comprises at least one of encoded meta-channel data generated by performing error correction encoding on the meta-channel data, and an encoded meta-channel program generated by performing error correction encoding on the meta-channel program;

the to-be-processed information comprises an instruction and to-be-processed data; and the encoded to-be-processed information comprises at least one of an encoded instruction generated by performing error correction encoding on the instruction, and encoded to-be-processed data generated by performing error correction encoding on the to-be-processed data.

7. The data processing system according to claim 1, wherein the encoded processing rule and the processing rule have same semantics; the encoded to-be-processed information and the to-be-processed information have same semantics.

8. The data processing system according to claim 1, wherein heterogeneity of encoded processing rules configured for the M meta-channels comprises at least one of:

heterogeneity in contents of the encoded meta-channel data, heterogeneity in structures of the encoded meta-channel data, heterogeneity in instruction contents of the encoded meta-channel programs and heterogeneity in instruction sequences of the encoded meta-channel programs in the M meta-channels;

the heterogeneity in the contents of the encoded meta-channel data comprises at least one of: signature diversity, tag diversity, verification diversity, encryption diversity, scrambling diversity, compression diversity, transformation diversity, and compilation diversity;

the heterogeneity in structures of the encoded meta-channel data comprises at least one of: inter-frame and intra-frame stack layout randomization, stack randomization, basic block diversity, compilation diversity, and conversion diversity of converting a stack variable to a stack;

the heterogeneity in instruction contents of the encoded meta-channel programs comprises at least one of signature diversity, tag diversity, verification diversity, encryption diversity, scrambling diversity, compression diversity, transformation diversity, compilation diversity, instruction random tag diversity, and instruction set randomization; and the heterogeneity in instruction sequences of the encoded meta-channel programs comprises at least one of: randomization of a position of an instruction for realizing dynamically heterogeneous redundancy of a meta-channel operation sequence, basic block diversity, randomization of a position of a block-level instruction, probabilistic control flow integrity, diversity of structured non-overlapping codes and calling sequences, diversity of adapted processors, diversity of adapted operating systems, diversity of adapted software protocols, diversity of adapted databases, compilation diversity, and diversity of programming languages.

9. The data processing system according to claim 1, wherein the N pieces of heterogeneous encoded to-be-processed information have at least one of heterogeneity in data contents, heterogeneity in data structures, heterogeneity in instruction contents, and heterogeneity in instruction sequences;

the heterogeneity in data contents comprises at least one of signature diversity, tag diversity, verification diversity, encryption diversity, scrambling diversity, compression diversity, transformation diversity, and compilation diversity;

the heterogeneity in data structures comprises at least one of: inter-frame and intra-frame stack layout randomization, stack randomization, basic block diversity, compilation diversity, and conversion diversity of converting a stack variable to a stack;

the heterogeneity in instruction contents comprises at least one of: signature diversity, tag diversity, verification diversity, encryption diversity, scrambling diversity, compression diversity, transformation diversity, compilation diversity, instruction random tag diversity, and instruction set randomization; and the heterogeneity in instruction sequences comprises at least one of: randomization of a position of an instruction for realizing dynamically heterogeneous redundancy of a meta-channel operation sequence, basic block diversity, randomization of a position of a block-level instruction, probabilistic control flow integrity, diversity of structured non-overlapping codes and calling sequences, diversity of adapted processors, diversity of adapted operating systems, diversity of adapted software protocols, diversity of adapted databases, compilation diversity, and diversity of programming languages.

10. The data processing system according to claim 1, wherein the error correction decoder is further configured to perform error correction decoding on N channels of response data so as to obtain response information corresponding to the to-be-processed information by:

decoding the N channels of response data with a scheme corresponding to a scheme of the error correction encoding, to obtain N channels of data to be determined; and performing an error correction determination process on the N channels of data to be determined, to obtain a processing result.

11. A data processing method based on dynamically redundant heterogeneous encoding, comprising:

performing N-channel error correction encoding on to-be-processed information to obtain N pieces of heterogeneous encoded to-be-processed information, wherein N is an integer greater than or equal to 2;

performing N-channel redundancy processing on the N pieces of heterogeneous encoded to-be-processed information to obtain N channels of response data, wherein a processing flow in any channel of the N-channel redundancy processing comprises:

processing the encoded to-be-processed information according to an encoded processing rule that is pre-configured, the encoded processing rule being generated by performing error correction encoding on a pre-configured processing rule, and encoded processing rules to be used in the N-channel redundancy processing being heterogeneous; and performing error correction decoding on the N channels of response data to obtain response information corresponding to the to-be-processed information.

12. An electronic device comprising a memory and a processor; wherein the memory is stored with a program, and the processor is configured to run the program to:

perform N-channel error correction encoding on to-be-processed information to obtain N pieces of heterogeneous encoded to-be-processed information, wherein N is an integer greater than or equal to 2;

perform N-channel redundancy processing on the N pieces of heterogeneous encoded to-be-processed information to obtain N channels of response data, wherein a processing flow in any channel of the N-channel redundancy processing comprises:

processing the encoded to-be-processed information according to an encoded processing rule that is pre-configured, the encoded processing rule being generated by performing error correction encoding on a pre-configured processing rule, and encoded processing rules to be used in the N-channel redundancy processing being heterogeneous; and perform error correction decoding on the N channels of response data to obtain response information corresponding to the to-be-processed information.

* * * * *